(12) United States Patent
Seo et al.

(10) Patent No.: US 6,960,030 B2
(45) Date of Patent: Nov. 1, 2005

(54) OPTICAL CONNECTOR BOOT WITH CONTROLLED ROTATION FEATURE

(75) Inventors: Koji Seo, Tokyo (JP); Masato Shiino, Tokyo (JP); Shinichi Matsumoto, Tokyo (JP); Hideki Miyazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 26 days.

(21) Appl. No.: 10/445,904

(22) Filed: May 28, 2003

(65) Prior Publication Data

US 2004/0005123 A1 Jan. 8, 2004

(30) Foreign Application Priority Data

Jun. 5, 2002 (JP) ......................................... 2002-164823
Oct. 28, 2002 (JP) ......................................... 2002-312703

(51) Int. Cl.[7] ............................................... G02B 6/36
(52) U.S. Cl. .............................. 385/86; 385/76; 385/87
(58) Field of Search ............................. 385/86, 76, 77, 385/87

(56) References Cited

U.S. PATENT DOCUMENTS 4,078,853 A * 3/1978 Kempf et al. ................ 385/114
6,435,732 B1 * 8/2002 Asao et al. .................... 385/78
6,594,437 B1 * 7/2003 Nicolas ........................ 385/139
6,601,997 B2 * 8/2003 Ngo ............................. 385/86
6,629,783 B2 * 10/2003 Ngo ............................. 385/86
6,672,774 B2 * 1/2004 Theuerkorn et al. .......... 385/86

* cited by examiner

Primary Examiner—Chandrika Prasad
(74) Attorney, Agent, or Firm—Oblon, Spivak, McClelland, Maier & Neustadt, P.C.

(57) ABSTRACT

Provided in the present specification is an optical connector boot including: an attachment portion attached to a connector ferrule, and a cable passing portion through which a flat type optical fiber cable is passed, in which there is provided at one longitudinal end of the cable passing portion an inlet for introducing the flat type optical fiber cable into the cable passing portion, in which there is provided in the attachment portion an outlet for drawing out the flat type optical fiber cable inserted into the cable passing portion, and in which the inlet and the outlet differ from each other in orientation so that the flat type optical fiber cable inserted into the cable passing portion through the inlet may be twisted around its axis within the cable passing portion by drawing it out of the outlet. According to an optical connector of the present invention, a flat type optical fiber cable inserted into and secured in a ferrule is covered with the optical connector boot.

11 Claims, 15 Drawing Sheets

FIG. 10A
FIG. 10B
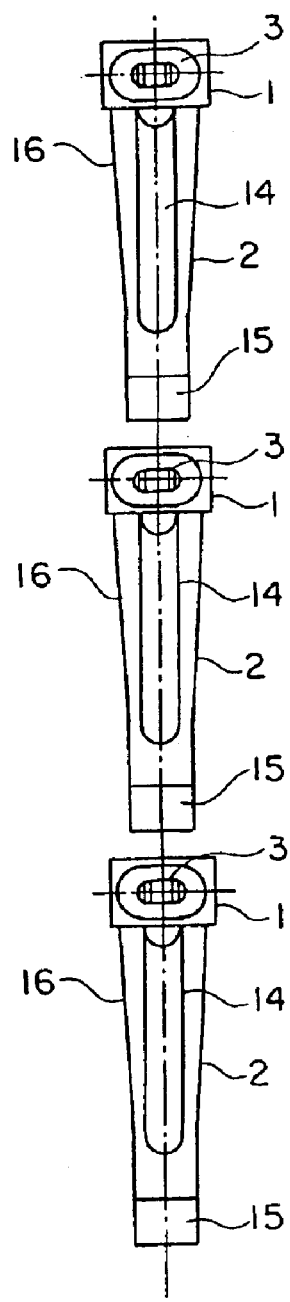
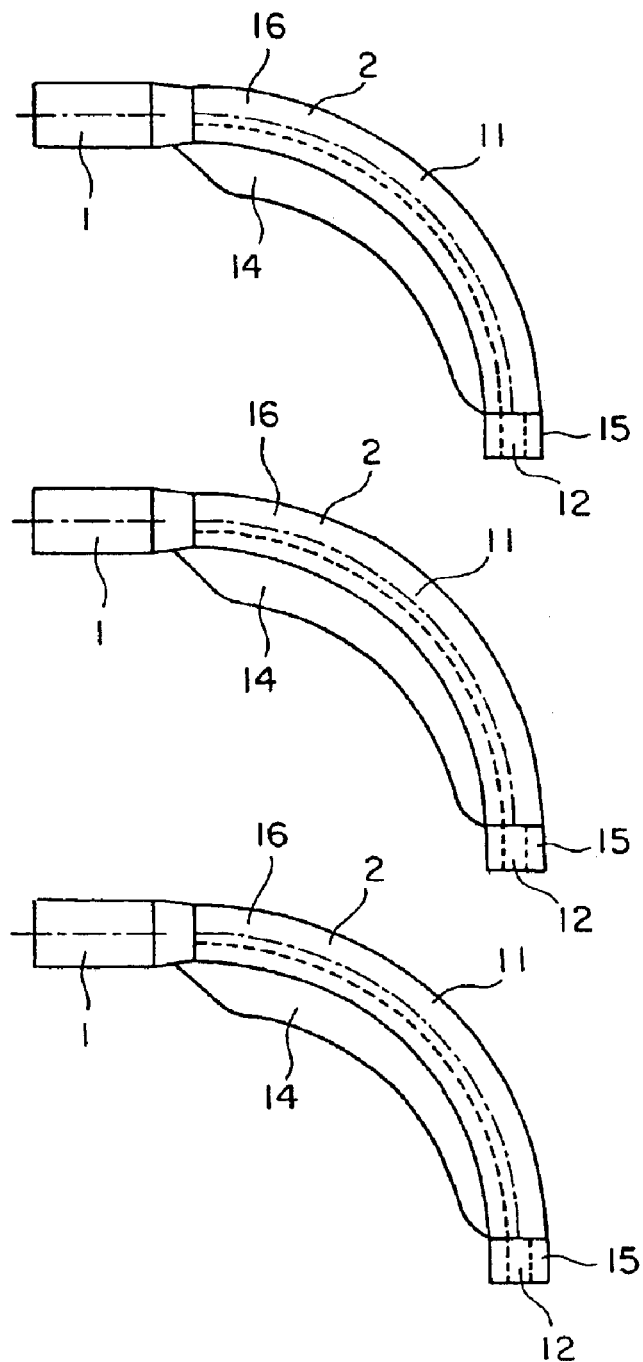

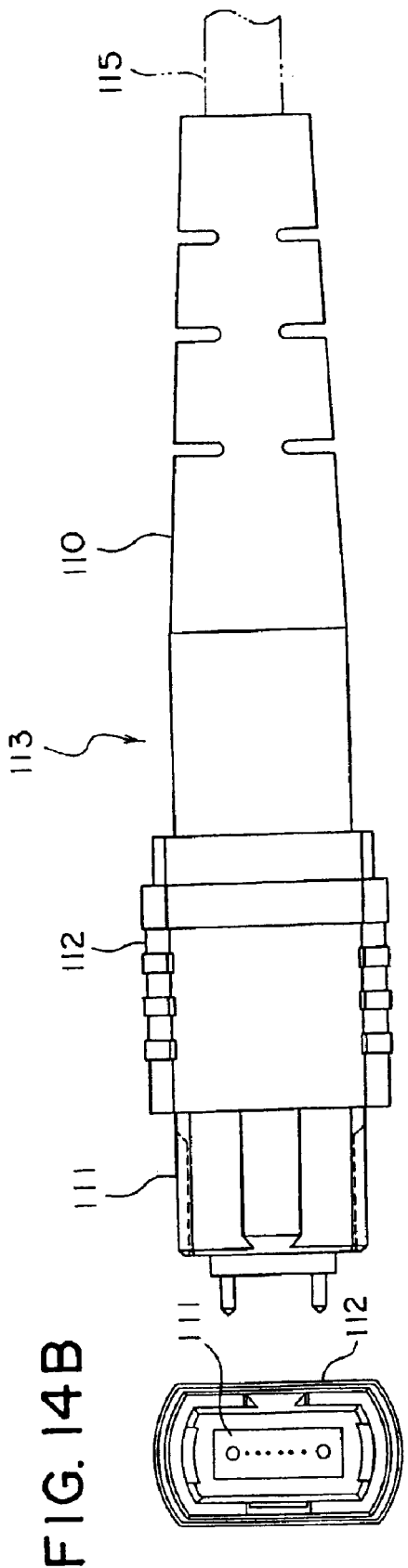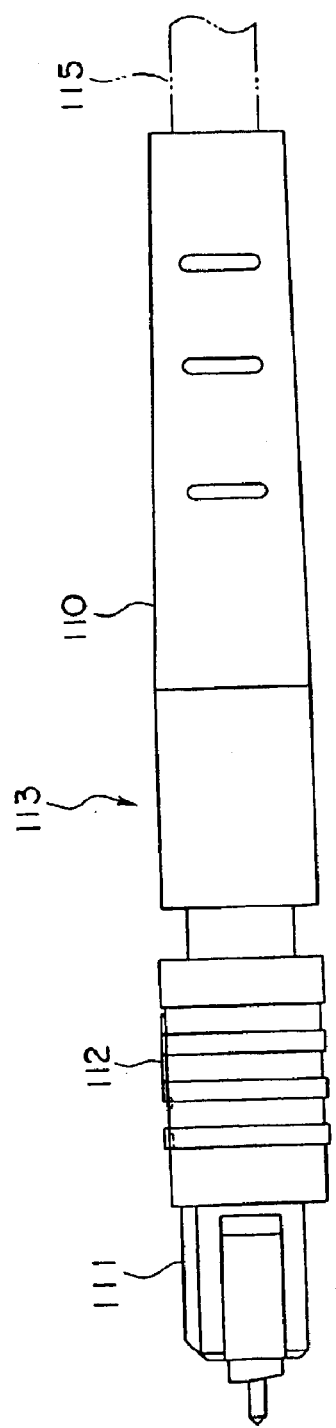

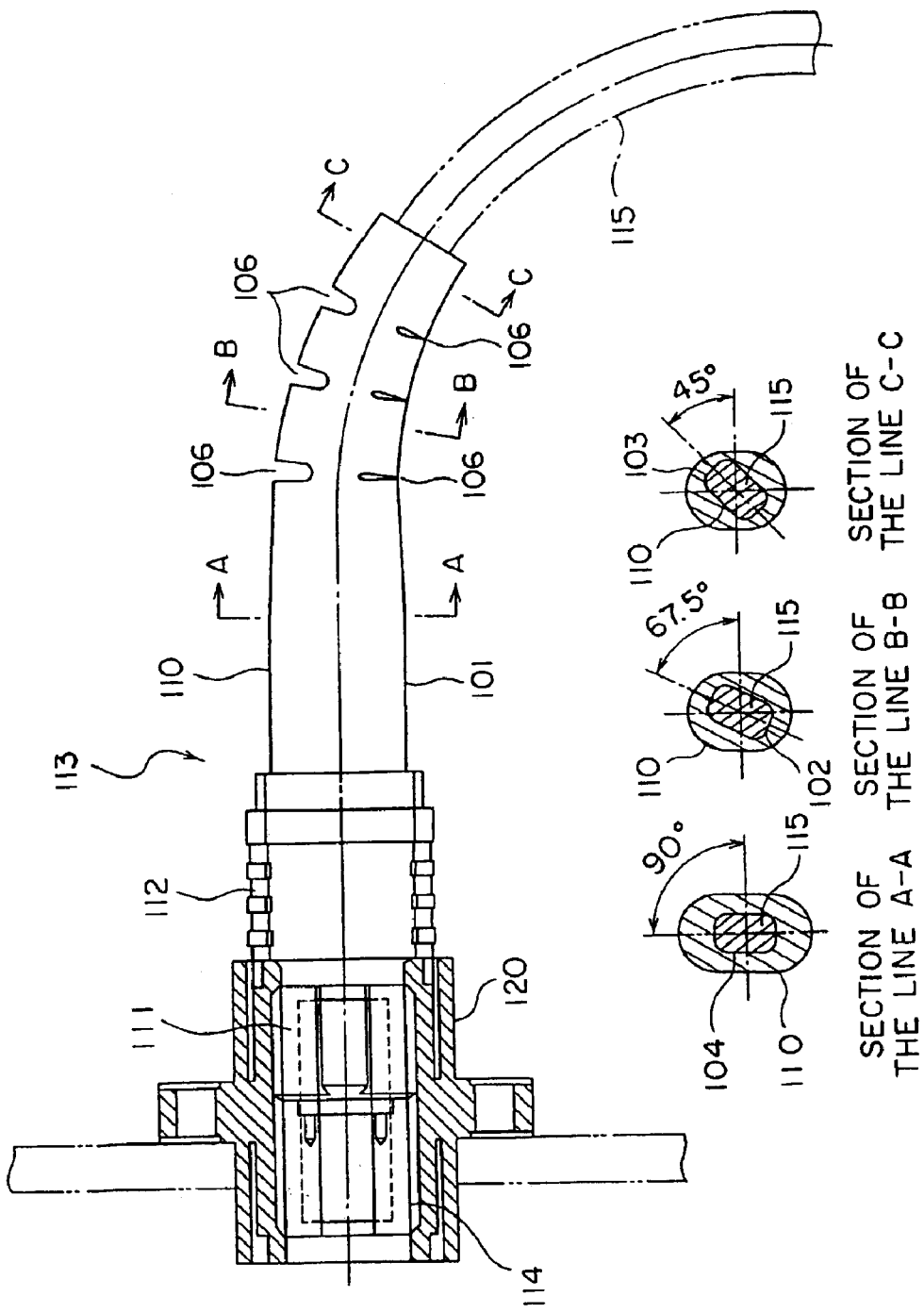

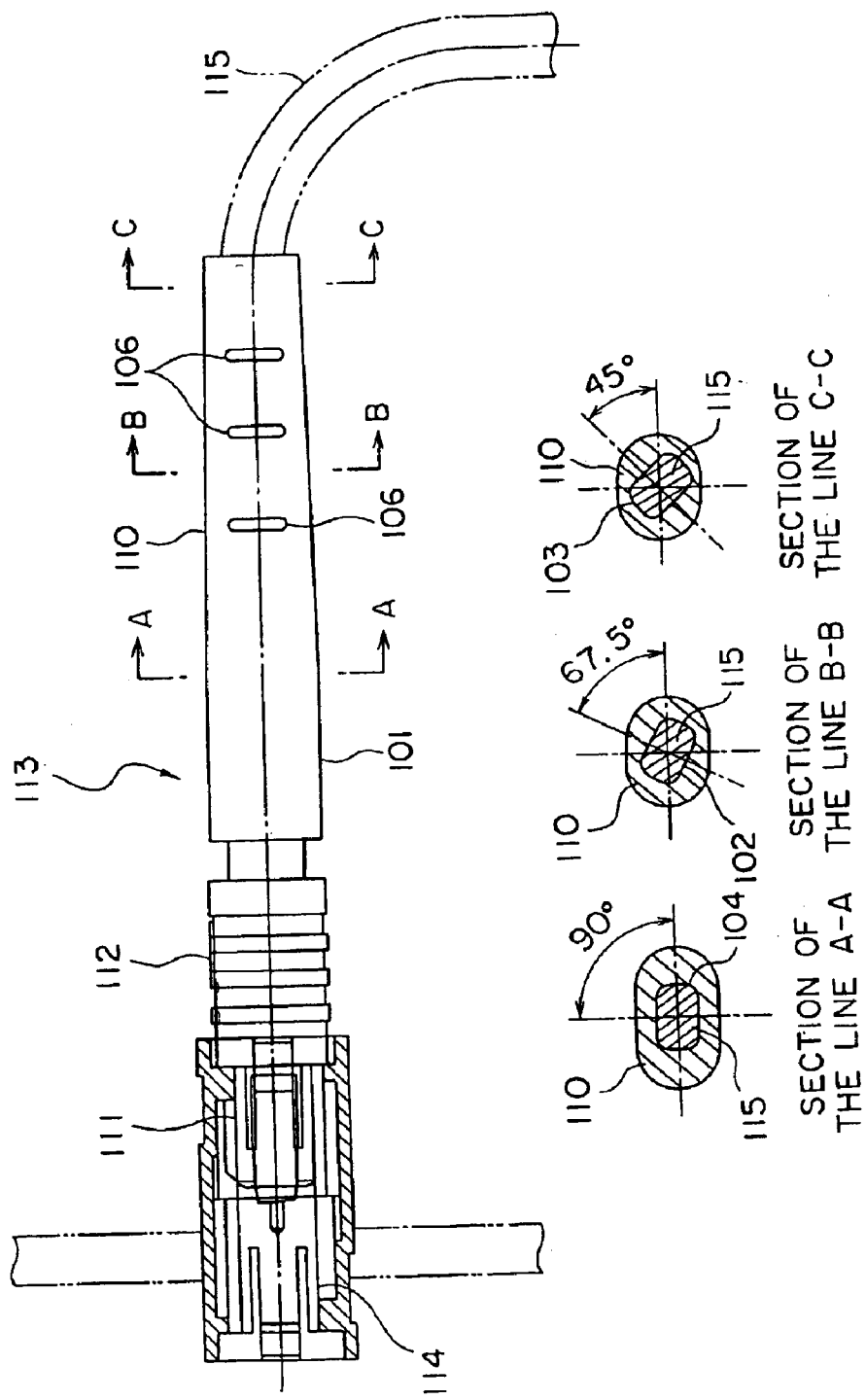

OPTICAL CONNECTOR BOOT WITH CONTROLLED ROTATION FEATURE

BACKGROUND OF THE INVENTION

1. Field of the Invention

The present invention relates to an optical connector boot mounted to the forward end portion of an optical fiber cable inserted into and secured in a connector ferrule.

2. Description of the Related Art

An optical fiber cable tends to undergo an increase in radiation loss when its bending radius is reduced. Thus, when an optical fiber cable is inserted into and secured in a connector ferrule to assemble an optical connector, it is general practice to pass the forward end portion of the optical fiber cable through an optical connector boot mounted to the rear end portion of the connector ferrule so that the bending radius of the optical fiber cable may not become less than a predetermined value, thereby preventing the optical fiber cable from being bent.

In a known optical connector boot (commonly called a "direction changing boot"), the forward end portion of the optical fiber cable passed therethrough is gradually bent as it extends in the axial direction. FIG. 21 shows an example of this type of optical connector boot. The optical connector boot shown in FIG. 21 is equipped with an attachment portion A to be mounted to the rear end portion of a connector ferrule and a cable passing portion B which has a semi-arcuate sectional configuration and through which an optical fiber cable with a round sectional configuration (hereinafter referred to as a "round type optical fiber cable") is passed. At one longitudinal end of the cable passing portion B, a retaining member C protrudes radially so as to lap the round type optical fiber cable passed through the cable passing portion B to thereby retain the cable within the cable passing portion B. Further, the cable passing portion B is curved gradually as it extends in the longitudinal direction. Provided in the attachment portion A is an outlet hole E communicating with the cable passing portion B and allowing the forward end portion of the optical fiber cable passed through the cable passing portion B to be drawn out.

Apart from a round type optical fiber cable as mentioned above, a flat type optical fiber cable with a flat section is also inserted into and secured in a connector ferrule. However, the connector boot shown in FIG. 21 is designed for a round type optical fiber cable and its cable passing portion B has a semi-arcuate sectional configuration as mentioned above. Thus, if a flat type optical fiber cable with a flat section is passed through the cable passing portion B of the connector boot shown in FIG. 21, the cable may be twisted or bent in an unexpected direction.

In a state in which an optical connector equipped with a connector boot is connected to the other connector or the like, application of a vertical or lateral tensile load to a flat type optical fiber cable inserted into the connector boot will cause the boot to be bent in the corresponding direction, with the flat type optical fiber cable therein also being bent in the same direction. In particular, when the flat type optical fiber cable is a multi-core optical fiber, application of a vertical tensile load to the flat type optical fiber cable will generate an abrupt twisting within a small range of the multi-core optical fiber, resulting in an increase in connection loss and a break in the cable.

SUMMARY OF THE INVENTION

According to the present invention, there is provided an optical connector boot including: an attachment portion attached to a connector ferrule, and a cable passing portion through which a flat type optical fiber cable is passed, in which there is provided at one longitudinal end of the cable passing portion an inlet for introducing the flat type optical fiber cable into the cable passing portion, in which there is provided in the attachment portion an outlet for drawing out the flat type optical fiber cable inserted into the cable passing portion, and in which the inlet and the outlet differ from each other in orientation so that the flat type optical fiber cable inserted into the cable passing portion through the inlet may be twisted around its axis within the cable passing portion by drawing it out of the outlet.

According to the present invention, there is provided an optical connector boot including: an attachment portion attached to a connector ferrule, and a cable passing portion of a quadrilateral sectional configuration through which a flat type optical fiber cable is passed, in which the cable passing portion is curved from one longitudinal end thereof toward the other end, in which there is provided at one longitudinal end of the cable passing portion an inlet for introducing the flat type optical fiber cable into the cable passing portion, in which there is provided in the attachment portion an outlet for drawing out the flat type optical fiber cable inserted into the cable passing portion, and in which the inlet and the outlet differ from each other in orientation so that the flat type optical fiber cable inserted into the cable passing portion through the inlet may be twisted around its axis within the cable passing portion by drawing it out of the outlet.

According to the present invention, there is provided an optical connector boot formed as a cylindrical member through which a flat type optical fiber cable can be inserted and which has at one longitudinal end thereof an inlet allowing introduction of the flat type optical fiber cable and at the other end thereof an outlet allowing extraction of the flat type optical fiber cable, in which the inlet and the outlet differ from each other in orientation so that the flat type optical fiber cable introduced through the inlet may be twisted inside the optical connector boot around its axis by drawing it out of the outlet.

According to the present invention, there is provided an optical connector boot formed as a cylindrical member through which a flat type optical fiber cable can be inserted and which has at one longitudinal end thereof an inlet allowing introduction of the flat type optical fiber cable and at the other end thereof an outlet allowing extraction of the flat type optical fiber cable, in which the inlet and the outlet differ from each other in orientation so that the flat type optical fiber cable introduced through the inlet may be twisted inside the optical connector boot around its axis by drawing it out of the outlet, and in which the orientation of the inlet is deviated by 40 to 90° with respect to that of the outlet.

BRIEF DESCRIPTION OF THE DRAWINGS

FIG. 10A is a front view of three optical connector boots as shown in FIGS. 7A through 7C arranged in a line;

FIG. 10B is a side view of these optical connector boots;

FIG. 14A is a plan view showing an example of an MPO optical connector into which an optical connector boot according to the present invention is incorporated;

FIG. 14B is a left-hand side view of the MPO optical connector;

FIG. 14C is a side view of the MPO optical connector;

FIG. 15 is a side view, partially in section, showing how the MPO optical connector of FIG. 14A is vertically connected to the other connector;

FIG. 16 is a top view, partially in section, showing how the MPO optical connector of FIG. 14A is horizontally connected to the other connector;

DESCRIPTION OF THE PREFERRED EMBODIMENTS (Optical Connector Boot According to Embodiment 1)

Figure 1:
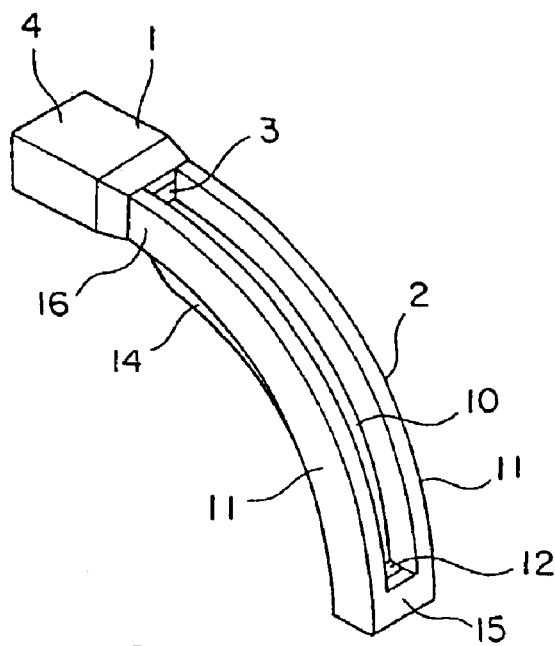
FIG. 1 is an explanatory view showing an optical connector boot according to an embodiment of the present invention.
Figure 2A:
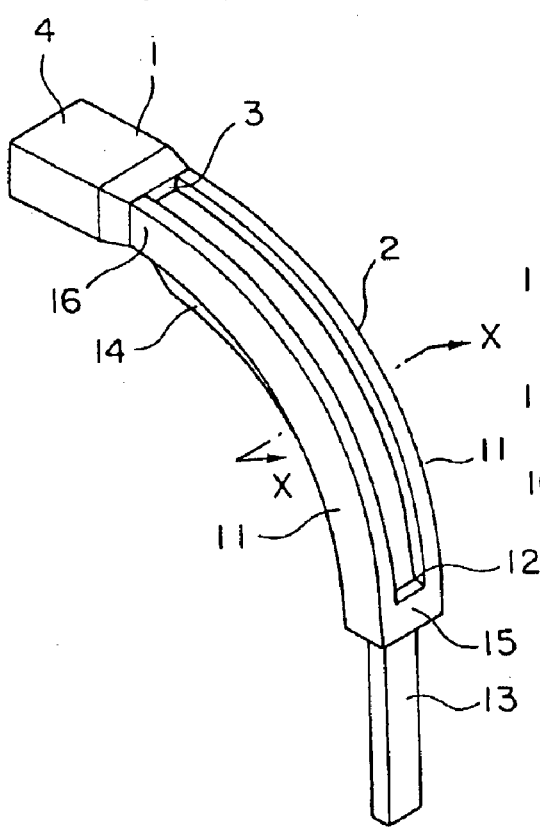
FIG. 2A is a perspective view showing a state in which a flat type optical fiber cable has been passed through the optical connector boot shown in FIG. 1.
Figure 2B:
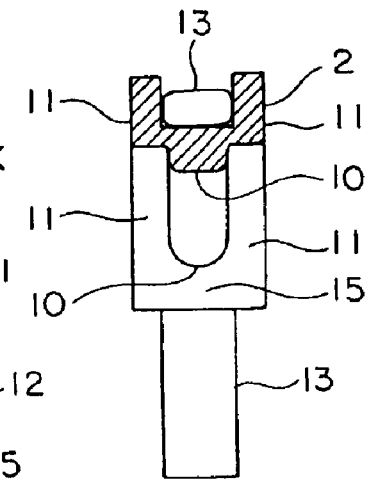
FIG. 2B is a sectional view taken along the line X—X of FIG. 2A.

An optical connector boot according to Embodiment 1 of the present invention will be described with reference to FIGS. 1, 2A, and 2B. An optical connector boot of this embodiment is mounted to the forward end portion of an optical fiber cable (flat type optical fiber cable) inserted into and secured in a connector ferrule. In the optical connector boot, an attachment portion 1 (FIG. 1) attached to the connector ferrule and the thin and narrow cable passing portion 2 of a quadrilateral sectional configuration through which the flat type optical fiber cable 13 is passed as shown in FIGS. 2A and 2B are formed into an integral unit.

The attachment portion 1 is formed as a tubular and quadrilateral member equipped with an outlet 3 for drawing out the flat type optical fiber cable 13 passed through the cable passing portion 2. The outlet 3 is of substantially the same rectangular configuration as the contour of the flat type optical fiber, and is oriented horizontally.

One longitudinal end portion of the attachment portion 1 is a mounting end portion 4 to be mounted to the connector ferrule (not shown). The mounting end portion 4 is inserted into the connector ferrule through the insertion inlet thereof, and is secured in the connector ferrule by an arbitrary fixing means. For example, an engagement protrusion (not shown) formed on the mounting end portion 4 is engaged with an engagement recess formed inside the connector ferrule.

The cable passing portion 2 is a groove having a nearly U-shaped sectional configuration, and is gradually curved downwards from one longitudinal end (attachment-portion-side end portion) 16 toward the other end (cable grasping portion) 15. More specifically, the cable passing portion 2 is formed as an upwardly open groove with a U-shaped sectional configuration having a thin and narrow bottom surface 10 curved gradually downwards from the attachment-portion-side end portion 16 toward the cable grasping portion 15, with a side wall 11 being raised on either outer side thereof. Further, at the attachment-portion-side end portion 16 of the cable passing portion 2, there is laterally formed an inlet 12 of the same configuration as the outlet 3. Thus, when, as shown in FIG. 2B, the flat type optical fiber cable 13 is inserted from below through the inlet 12, and passed through the cable passing portion 2, the optical fiber cable 13 is surrounded on three sides by the bottom surface 10 and the mutually opposing side walls 11 of the cable passing portion 2. As a result, the position (orientation) of the flat type optical fiber cable in the cable passing portion 2 is stabilized, making it possible to prevent the optical fiber cable 13 from being twisted or bent in an unexpected direction. Of course, the flat type optical fiber cable passed through the cable passing portion 2 is gradually curved in conformity with the curvature of the cable passing portion 2. On the back side of the bottom surface 10, there is formed a longitudinal reinforcing rib 14.

(Optical Connector Boot According to Embodiment 2)

Figure 3:
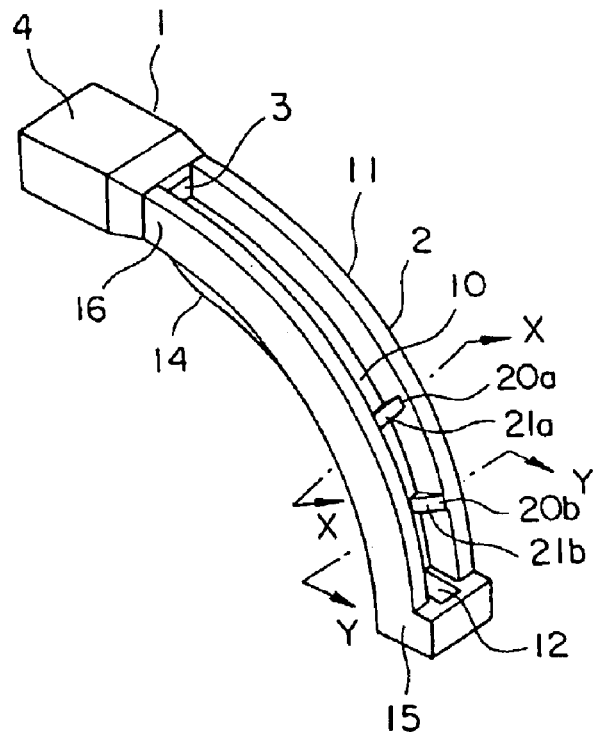
FIG. 3 is an explanatory view showing an optical connector boot according to another embodiment of the present invention.

An optical connector boot according to Embodiment 2 of the present invention will be described with reference to FIGS. 3 and 4. FIG. 3 shows an optical connector boot to be mounted to the forward end portion of the flat type optical fiber cable 13 (FIG. 4) inserted into and secured in a connector ferrule. In the optical connector boot, the attachment portion 1 attached to the connector ferrule and the thin and narrow cable passing portion 2 of a quadrilateral sectional configuration through which the flat type optical fiber cable 13 is passed, are formed into an integral unit.

The attachment portion 1 shown in FIG. 3 is formed as a tubular and quadrilateral member equipped with an outlet 3 for drawing out the flat type optical fiber cable 13 passed through the cable passing portion 2. The outlet 3 is of substantially the same rectangular configuration as the contour of the flat type optical fiber cable 13, and is oriented horizontally.

One longitudinal end portion of the attachment portion 1 constitutes the mounting end portion 4 to be mounted to the connector ferrule (not shown). The mounting end portion 4 is inserted into the connector ferrule through the insertion inlet thereof, and is secured in the connector ferrule by an arbitrary fixing means. For example, an engagement protrusion (not shown) formed on the mounting end portion 4 is engaged with an engagement recess formed inside the connector ferrule.

Figure 5A:
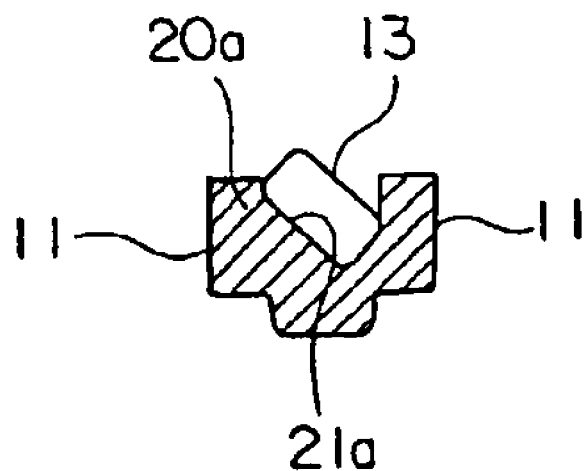
FIG. 5A is a sectional view of the optical connector boot shown in FIG. 3 taken along the line X—X, with a flat type optical fiber cable passed therethrough.
Figure 5B:
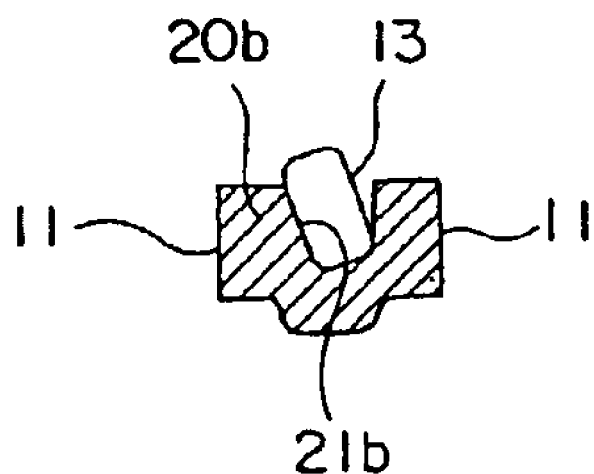
FIG. 5B is a sectional view of the same taken along the line Y—Y.

The cable passing portion 2 shown in FIG. 3 is formed as an upwardly open thin and narrow groove of a substantially U-shaped sectional configuration, and is gradually curved downwards from the attachment-portion-side end portion 16 toward the cable grasping portion 15. More specifically, as shown in FIGS. 5A and 5B, a side wall 11 is raised on either side of its thin and narrow bottom surface 10 gradually curved as it extends in the longitudinal direction to thereby realize an upwardly open U-shaped sectional configuration. The cable grasping portion 15 of the cable passing portion 2 has an inlet 12 of the same configuration as the outlet 3, and the inlet 12 is oriented vertically (perpendicular to the outlet 3). On the back side of the bottom surface 10, there is formed the reinforcing rib 14 in the longitudinal direction thereof.

The flat type optical fiber cable inserted into the cable passing portion 2 through the inlet 12 of the cable grasping portion 15 is passed through the cable passing portion 2, and is drawn out through the outlet 3 of the attachment portion 1 to be inserted into and secured in the connector ferrule. In this case, the inlet 12 is formed so as to be lateral, whereas the outlet 3 is formed so as to be longitudinal. That is, the inlet 12 and the outlet 3 differ in orientation by 90°, so that, as shown in FIG. 4 (in which the cable passing portion 2 is omitted so that the twisting of the flat type optical fiber cable 13 may be easily seen), the flat type optical fiber cable 13 passed through the passing portion 2 is gradually tilted face down from the inlet 12 side toward the outlet 3 side and twisted around its axis. As a result, the flat type optical fiber cable 13 is changed in orientation by 90° around its axis, and drawn out of the optical connector boot to be inserted into and secured in the connector ferrule.

Figure 4:
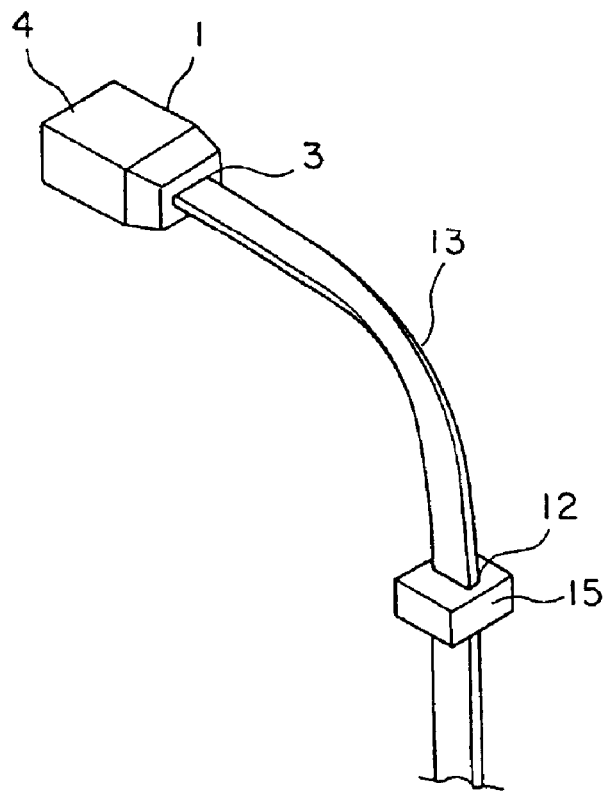
FIG. 4 is an explanatory view showing the flat type optical fiber cable passed through the optical connector boot shown in FIGS. 2A and 2B.

Inside the cable passing portion 2, there are formed, integrally with the cable passing portion 2 and at two longitudinal positions thereof, a support portion 20a (FIGS. 3 and 5A) and a support portion 20b (FIGS. 3 and 5B) for supporting the flat type optical fiber cable 13, twisted as shown in FIG. 4, from below (from the bottom surface 10 side of the cable passing portion 2) and preventing further tilting and twisting of the optical fiber cable 13. The support portions 20a and 20b are respectively equipped with support surfaces 21a and 21b inclined so as to be in conformity with the outer surface of the flat type optical fiber cable 13 twisted within the cable passing portion 2. Of the two support portions 20a and 20b, the support portion 20a formed on the outlet 3 side has its support surface 21a (FIG. 5A) inclined less steeply than the support surface 21b (FIG. 5B) of the support portion 20b formed on the inlet 12 side. This arrangement is in correspondence with the degree of twisting of the flat type optical fiber cable 13, which gradually increases from the inlet 12 side toward the outlet 3 side.

The number of such support portions may also be one or three or more. Further, it is also possible to form the support portion such that it is longitudinal and continuous over the entire length of the cable passing portion 2. In the former case, the nearer to the outlet side 3, the less steeply inclined is the support surface of the support portion. In the latter case, the inclination of the support surface is made so as to become gradually gentler from the inlet 12 side toward the outlet 3 side. These arrangements are adopted in order to make the support surface in conformity with the twisting of the flat type optical fiber cable 13, making it possible to support the optical fiber cable 13 from below.

(Optical Connector Booth According to Embodiment 3)

An optical connector boot according to Embodiment 3 of the present invention will be described with reference to FIGS. 6A and 6B. The basic construction of the optical connector boot of this embodiment is the same as that of Embodiment 2 (FIG. 3). The difference lies in the fact that, as shown in FIG. 6A, the outlet 3 of the attachment portion 1 is turned by 90° from the position as shown in FIG. 3 so that the outlet 3 may become vertical and that the inlet 12 of the cable passing portion 2 is turned by 90° from the position shown in FIG. 3 so that the inlet 12 may become horizontal.

Figure 6A:
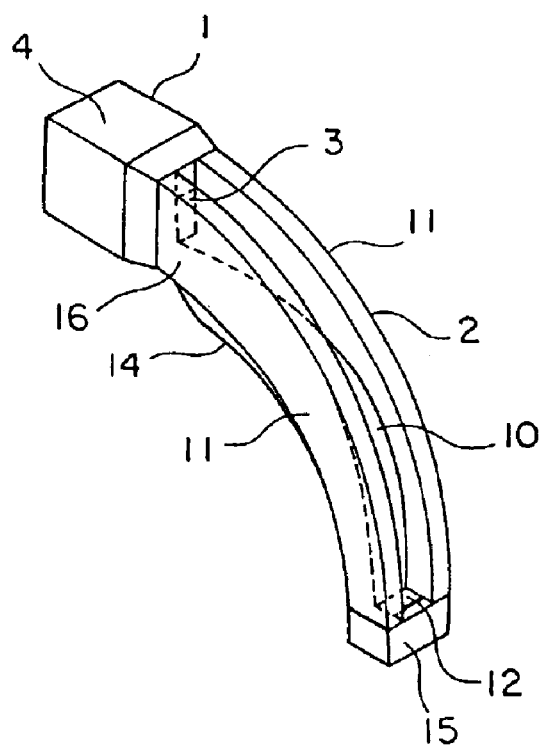
FIG. 6A is an explanatory view showing an optical connector boot according to still another embodiment of the present invention.
Figure 6B:
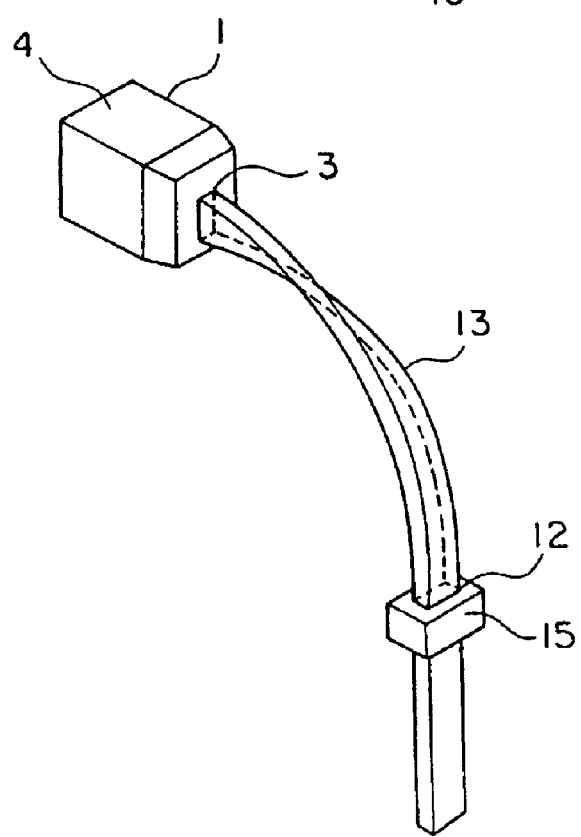
FIG. 6B is an explanatory view showing a flat type optical fiber cable passed through the optical connector boot shown in FIG. 6A.

As shown in FIG. 6B, due to the above-described construction, the flat type optical fiber cable 13, which is horizontal when inserted from below into the inlet 12, is gradually changed in orientation inside the cable passing portion 2 to become vertical when drawn out of the optical connector boot. That is, as shown in FIG. 6B (in which the cable passing portion 2 is omitted in order to enable the twisting of the flat type optical fiber cable 13 to be seen more easily), by using the optical connector boot of this embodiment, it is possible to twist the flat type optical fiber cable 13 in a direction deviated by 90° from that in the case of the optical connector boot of Embodiment 2. Thus, by appropriately choosing between the optical connector boot of Embodiment 1 and the optical connector boot of Embodiment 3, it is possible to further enhance the degree of freedom in terms of the routing of the flat type optical fiber cable 13.

Although not shown in FIG. 6A, the optical connector boot of Embodiment 3 is also equipped with support portions similar to those of Embodiment 2. Further, as in Embodiment 2, the number of such support portions may also be one or three or more, and it is also possible to form such a support portion such that it is longitudinal and continuous over the entire length of the cable passing portion 2. However, this embodiment differs from Embodiment 2 in the following points: in the former case, the nearer the support portion is to the outlet 3 side, the more steeply inclined is the support surface thereof, and, in the latter case, the inclination of the support surface becomes gradually steeper from the inlet 12 side toward the outlet 3 side. This difference, however, is not a substantial one. This difference is in correspondence with the fact that the flat type optical fiber cable of FIG. 6A, horizontal when inserted, is twisted and changed to a vertical position within the optical fiber boot as shown in FIG. 6B.

(Optical Connector Boot According to Embodiment 4)

Figure 7A:
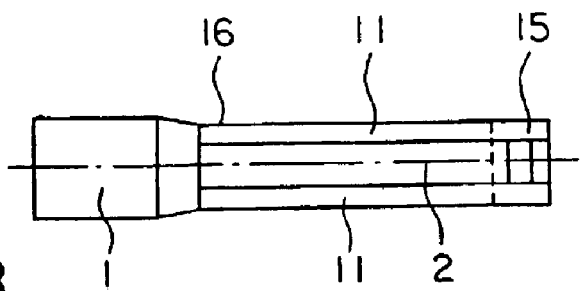
FIG. 7A is a plan view of the optical connector boot as shown in FIGS. 1 through 6B.
Figures 7B, 7C:
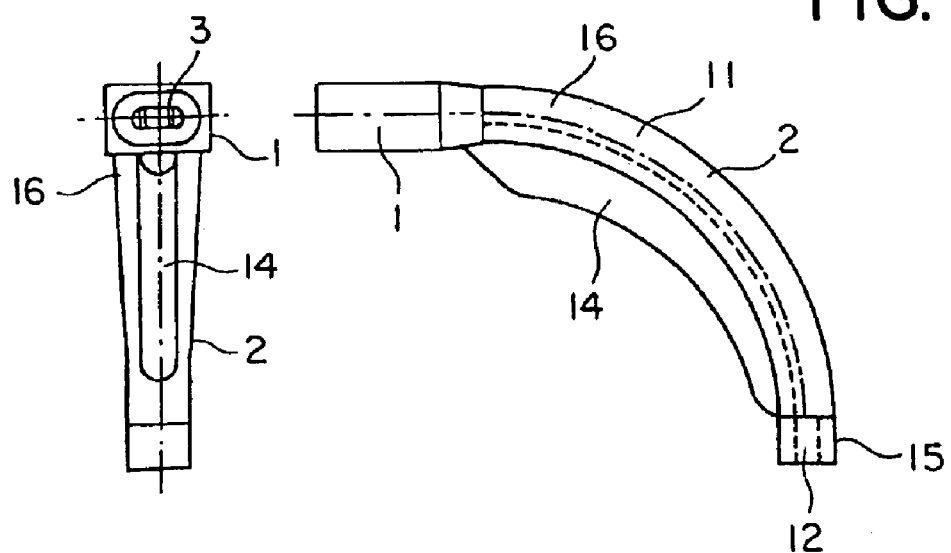
FIG. 7B is a front view of the optical connector boot.
FIG. 7C is a side view of the optical connector boot.
Figure 8A:
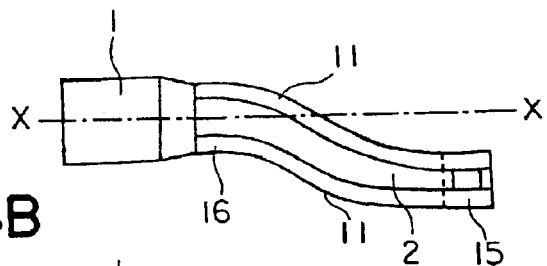
FIG. 8A is a plan view of an optical connector boot according to the present invention, with its cable passing portion curved.
Figure 8B:
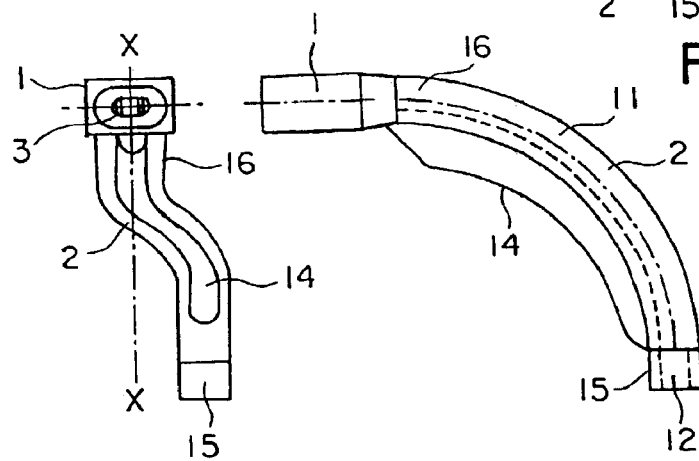
FIG. 8B is a front view of the same.
Figure 8C:
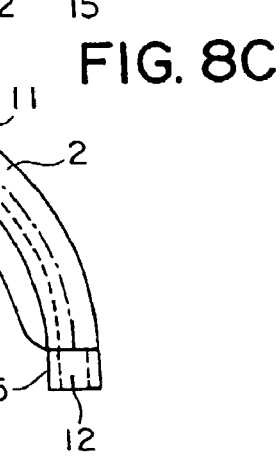
FIG. 8C is a side view of the same.
Figure 11A:
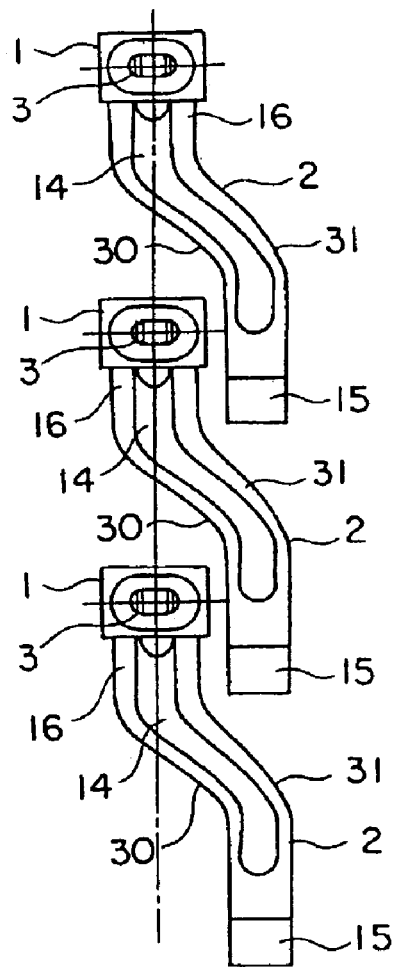
FIG. 11A is a front view of three optical connector boots as shown in FIGS. 8A through 8C arranged in a line.
Figure 11B:
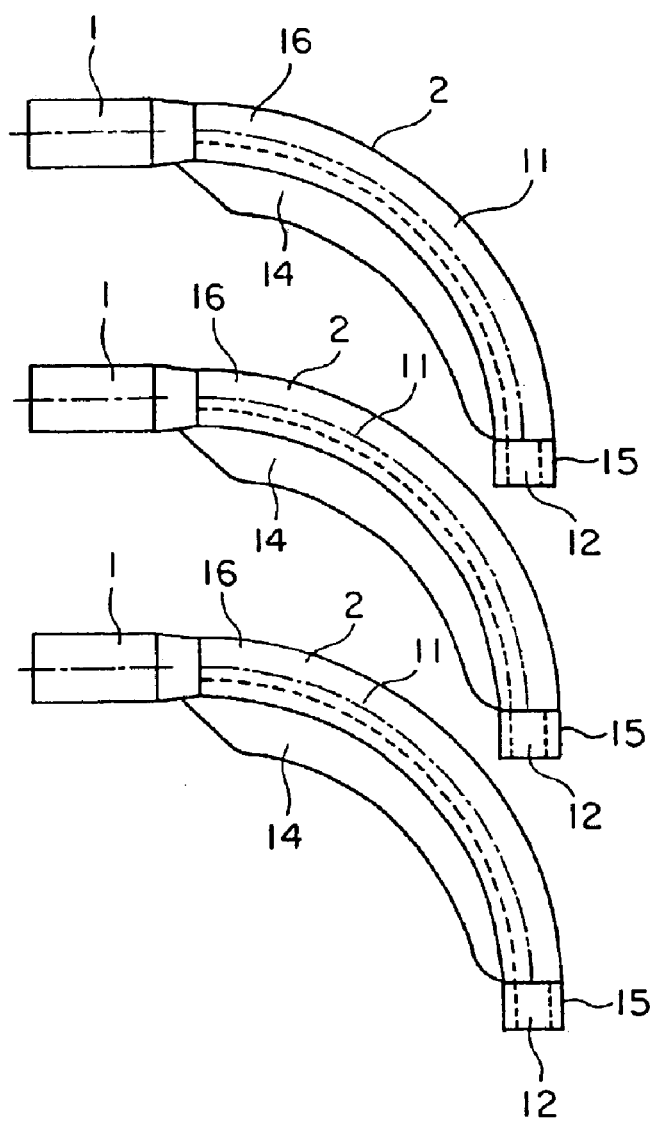
FIG. 11B is a side view of these optical connector boots.

While in the optical connector boots of Embodiments 1 through 3 the attachment portion 1 and the cable passing portion 2 are formed so as to lie in alignment on the same line as shown in FIGS. 7A through 7C, it is also possible, in the present invention, for the cable passing portion 2 to be curved and offset with respect to the line X—X connecting the attachment portion 1 and the cable passing portion 2 (the central axis of the attachment portion 1), as shown in FIGS. 8A through 8C. In this case, there are no particular limitations regarding the amount of positional deviation (positional deviation width). However, it is desirable for the positional deviation amount to correspond to the boot width (the external width of the cable passing portion) so that the boot may be curved as shown in FIGS. 8A and 8B. When a number of optical connector boots are arranged side by side as shown in FIGS. 11A and 11B, this curvature makes it possible for a curved portion 30 of one optical connector boot to overlap the exterior of the attachment portion 1 of another optical connector boot. Thus, it is possible to arrange the attachment portions 1 of a large number of optical connector boots in alignment on the same axis. Further, it is also possible to arrange an outer protrusions 31 of the cable passing portions 2, positionally deviated sidewise, in alignment on the same axis. Arrangement side by side of a number of optical connector boots as shown in FIGS. 1 through 6B will result in the state as shown in FIGS. 10A and 10B, which means an overlapping arrangement of plural optical connector boots as shown in FIG. 11A is not allowed.

While there are no particular limitations regarding the position where the cable passing portion 2 is curved (curvature start point), the nearer the curvature start point to the attachment portion 1, the more desirable it is from the viewpoint of achieving space saving. In this case, when the curvature start point of the cable passing portion 2 becomes nearer to the attachment portion 1, the bending radius of the flat type optical fiber cable is diminished, and the transmission loss of the flat type optical fiber cable increases, so that it is necessary to be careful in determining the curvature start point so that the bending radius may not become excessively small.

Figure 9A:
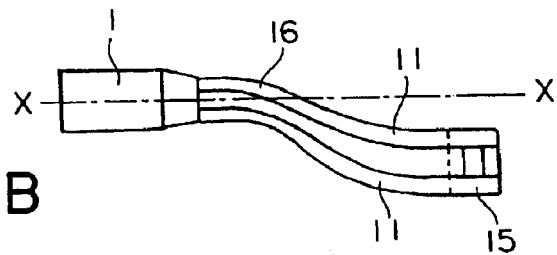
FIG. 9A is a plan view of anther optical connector boot according to the present invention, with its cable passing portion curved.
Figure 9B:
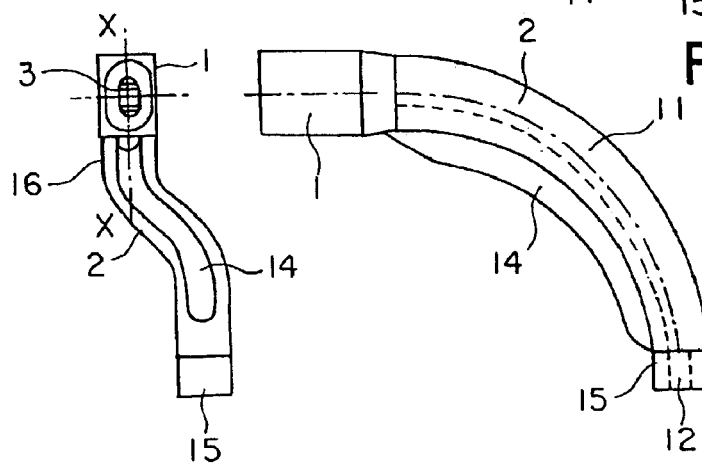
FIG. 9B is a front view of the same.
Figure 9C:
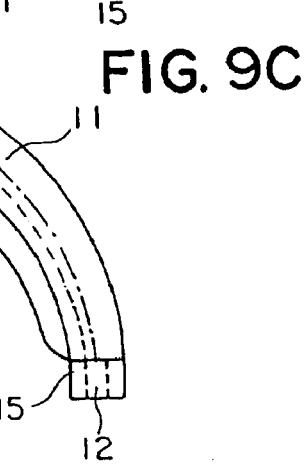
FIG. 9C is a side view of the same.

The basic configuration and construction of the optical connector boot shown in FIGS. 8A through 8C are the same as those of the optical connector boots shown in FIGS. 1 through 6B. The configuration and construction of the optical connector boot shown in FIGS. 9A through 9C are almost the same as those of the one shown in FIGS. 8A through 8C except that the orientation of the outlet 3 of the attachment portion 1 differs by 90° and that the orientation of the inlet 12 of the cable grasping portion 15 also differs by 90°.

(Optical Connector Boot According to Embodiment 5)

Figure 12A:
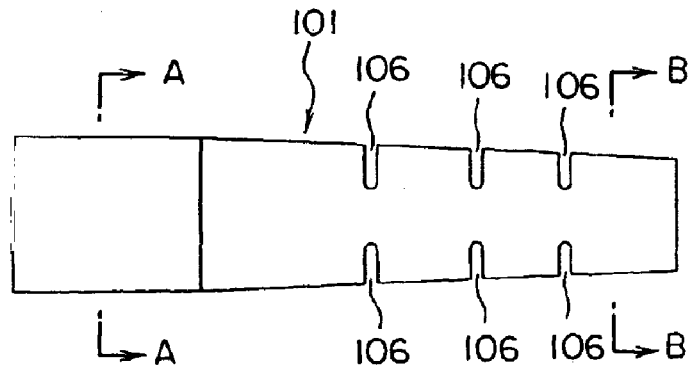
FIG. 12A is a side view of an optical connector boot according to one embodiment of the present invention.
Figure 12B:
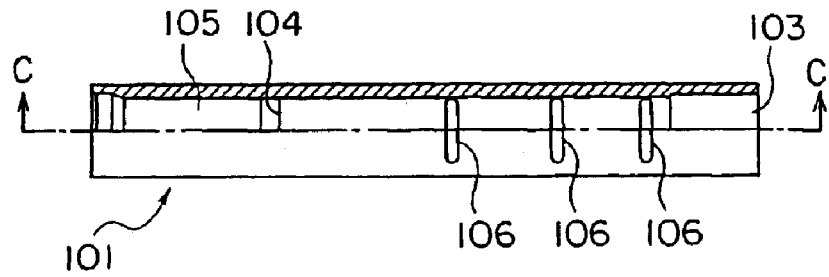
FIG. 12B is a top view, partially in section, of the optical connector boot.
Figure 12C:
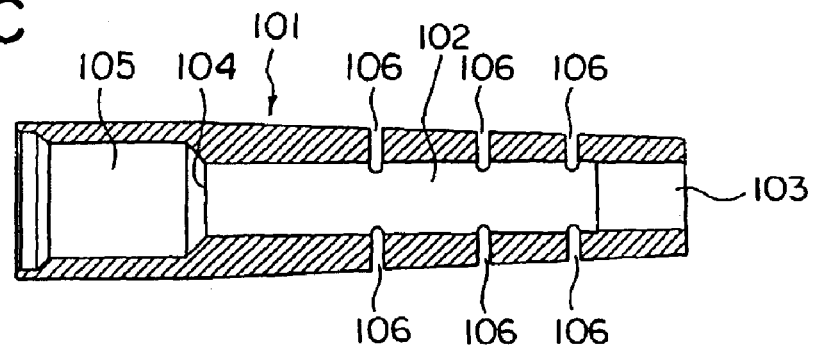
FIG. 12C is a sectional view taken along the line C—C of FIG. 12B.
Figure 13A:
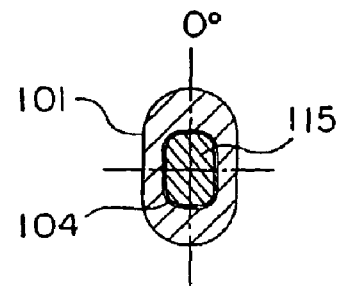
FIG. 13A is a sectional view of the optical connector boot taken along the line A—A of FIGS. 12A and 12B, with a flat type optical fiber cable passed therethrough.
Figure 13B:
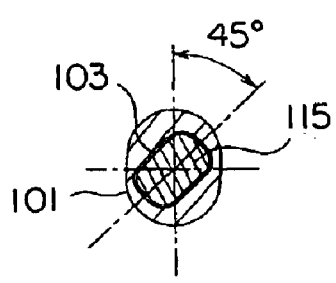
FIG. 13B is a sectional view taken along the line B—B of FIG. 12A.

An optical connector boot according to Embodiment 5 of the present invention will be described in detail with reference to FIGS. 12 through 16. This optical connector boot has a main body 101 as shown in FIGS. 12A through 12C formed of a synthetic resin of a Shore hardness (Shore A) of 70° or more, in which is formed a cable passing hole 102 allowing passage of a flat type optical fiber cable (an optical fiber cord, optical fiber tape core or the like). At one longitudinal end of the cable passing hole 102, there is provided an inlet 103 allowing introduction of a flat type optical fiber cable into the cable passing hole 102, and at the other end thereof, there is provided an outlet 104 allowing extraction of the flat type optical fiber cable from the cable passing hole 102, with a ferrule attachment portion 105 being formed in front of the outlet 104.

As shown in FIG. 12C, the cable passing hole 102 is a through-hole of a nearly quadrilateral sectional configuration whose inner diameter is large enough for the flat type optical fiber cable to pass, and its inner diameter is the same from one longitudinal end thereof to the other.

As shown in FIGS. 12A and 12B, both the inlet 103 and the outlet 104 have the same sectional configuration as that of the cable passing hole 102. However, the inlet 103 and the outlet 104 differ from each other in orientation. More specifically, the inlet 103 is inclined by 45° with respect to the outlet 104. Thus, the flat type optical fiber cable, introduced into the cable passing hole 102 through the inlet 103, is gently twisted around its axis within the cable passing hole 102 when it is extracted from the outlet 104.

As shown in FIG. 12C, the ferrule attachment portion 105 is a through-hole of a nearly quadrilateral sectional configuration (rectangle) with a diameter larger than that of the cable passing hole 102, and can accommodate the rear end portion of a ferrule (not shown), into which the flat type optical fiber cable extracted from the outlet 104 is inserted for fixation (i.e., it can be capped to the rear end portion of the ferrule).

As shown in FIGS. 12A through 12C, a plurality of slits 106 are formed in the outer peripheral surface of the main body 101 and arranged in the longitudinal direction thereof. More specifically, three slits 106 are arranged on the upper side of the axis of the main body 101, and three slits 106 forming pairs therewith are arranged on the lower side of the axis.

(Embodiment of Optical Connector)

FIGS. 14A and 14B show an MPO optical connector 113 having an MPO housing 112 accommodating a ferrule 111 into which an optical fiber passed through the above boot 110 is inserted for fixation, and FIG. 15 shows how the MPO optical connector 113 is connected to the other connector 114. In FIG. 15, the MPO optical connector 113 is connected vertically to the other connector 114, which is mounted to a board through the intermediation of an adapter 120. In this case, a flat type optical fiber cable 115 passed through the boot 110 is twisted gradually and gently around its axis within the cable passing hole 102 (see the sectional views taken along the lines A—A, B—B, and C—C in the drawings). Further, when a downward vertical load is applied to the flat type optical fiber cable 115, the slits 106 formed on the lower side of the axis of the boot 110 are crushed, and the slits 106 formed on the upper side thereof are opened, whereby the boot 110 is gently curved in the same direction, thereby preventing the flat type optical fiber cable 115 from being bent. As a result, abrupt twisting and bending in the flat type optical fiber cable 115 are prevented, so that there is no fear of a break in the flat type optical fiber cable 115 or an increase in loss.

Further, FIG. 16 shows how vertical load to the right and left is applied to the flat type optical fiber cable shown in FIG. 14. In this case, no slits 106 are formed in the right and left side surfaces of the boot 110, so that the boot 110 itself is not curved. However, since the flat type optical fiber cable 115 has been twisted beforehand by 45° within the cable passing hole 102, it undergoes no abrupt bending.

As described above, in the optical connector equipped with a boot according to the present invention, even if a vertical multi-directional load is applied to a flat type optical fiber cable passed through the boot, the flat type optical fiber cable undergoes no abrupt twisting or bending.

(Optical Connector Boot According to Embodiment 6)

Figure 17:
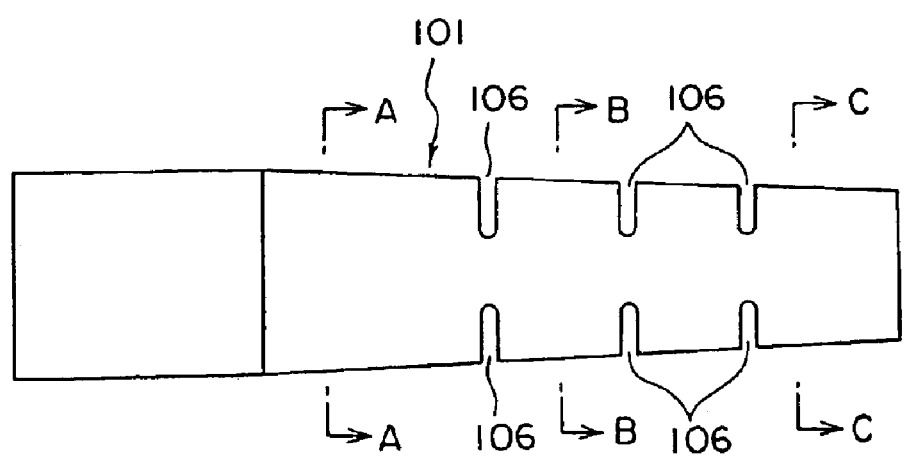
FIG. 17 is a side view showing an optical connector boot according to another embodiment of the present invention.
Figures 18A, 18B, 18C:
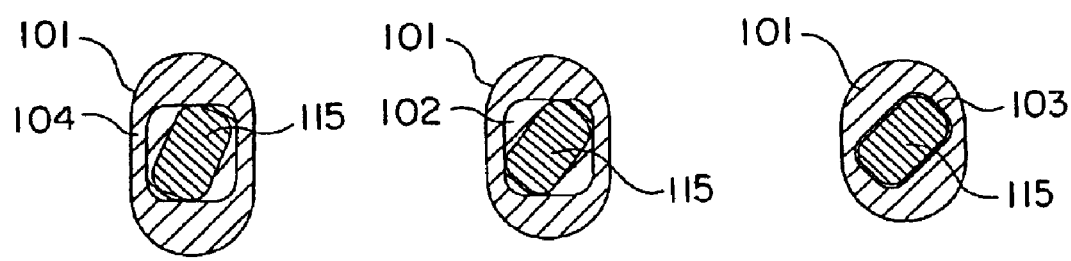
FIG. 18A is a sectional view taken along the line A—A of FIG. 17, showing a state in which an optical fiber has been passed through the connector boot of FIG. 17.
FIG. 18B is a sectional view taken along the line B—B of FIG. 17.
FIG. 18C is a sectional view taken along the line C—C of FIG. 17.

An optical connector boot according Embodiment 6 of the present invention will be described with reference to FIGS. 17 and 18. FIG. 17 is a side view of the optical connector boot of this embodiment. FIG. 18A is a sectional view taken along the line A—A of FIG. 17, FIG. 18B is a sectional view taken along the line B—B of FIG. 17, and FIG. 18C is a sectional view taken along the line C—C of FIG. 17. The basic construction of the optical connector boot shown in these drawings is similar to that of the optical connector boot of Embodiment 1. The difference lies in the fact that while the size and configuration of the inlet are almost the same as the external size and configuration of the flat type optical fiber cable (see FIG. 18C), the size and configuration of the cable passing hole and the outlet connected to the inlet are such that the flat type optical fiber cable is allowed to freely rotate around its axis (see FIGS. 18A and 18B).

(Optical Connector Boots According to Other Embodiments)

Figures 19A, 19B, 19C:
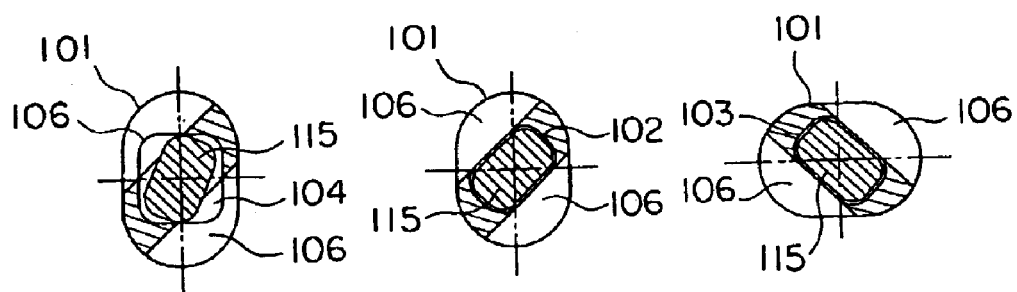
FIGS. 19A through 19C are sectional views showing an optical connector boot according to another embodiment of the present invention.
Figures 20A, 20B, 20C:
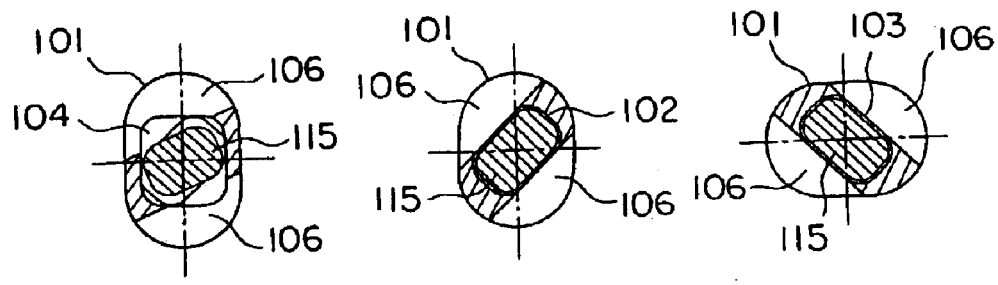
FIGS. 20A through 20C are sectional views showing an optical connector boot according to another embodiment of the present invention.
Figure 21:
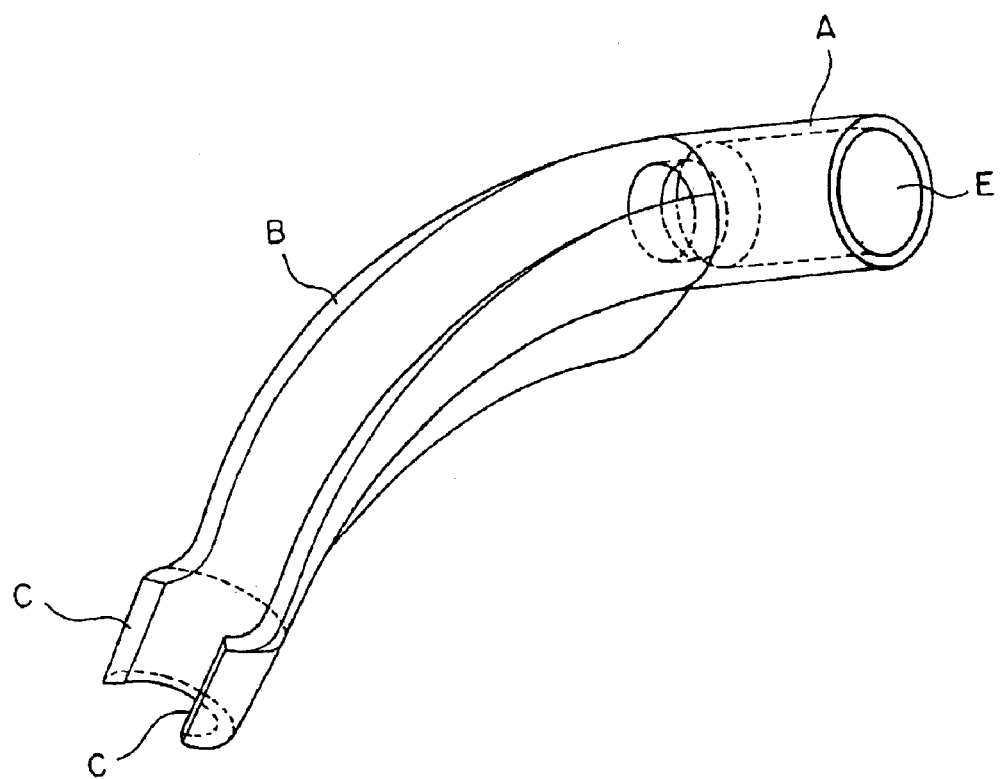
FIG. 21 is an explanatory view showing an example of a conventional optical connector boot.

As shown in FIGS. 19A through 19C, the slits 106 maybe inclined in section by 45°. Further, as shown in FIGS. 20A through 20C, it is also possible to form the slits in conformity with the inclination of the flat type optical fiber cable 115 so that the inclination of the flat type optical fiber cable 115 in section is parallel to the inclination of the slits 106.

There are no particular limitations regarding the sectional configuration of the inlet, cable passing hole, and outlet as long as it allows passage of a flat type optical fiber cable. For example, an elliptical sectional configuration is also acceptable.

While in the above embodiments the cable passing hole is simply formed as a linear through-hole, it is also possible for the cable passing hole to be twisted circumferentially and gradually from the inlet side toward the outlet side.

INDUSTRIAL AVAILABILITY

The optical connector boot of the present invention is equipped with the cable passing portion of the quadrilateral sectional configuration, so that the flat type optical fiber cable passed therethrough is surrounded by the inner walls of the cable passing portion, whereby occurrence of twisting and bending is restrained.

The optical connector boot according to the present invention is equipped with the support portion capable of supporting from below the flat type optical fiber cable twisted around its axis within the cable passing portion, so that no further twisting of the flat type optical fiber cable occurs within the cable passing portion, whereby it is possible to prevent a local increase in the degree of twisting of the flat type optical fiber cable, thereby preventing transmission loss.

In the optical connector boot according to the present invention, the cable passing portion is positionally deviated sidewise with respect to an axis connecting the attachment portion and the attachment portion side of the cable passing portion so as to exhibit a curved configuration, so that, as shown in FIGS. 11A through 11C, it is possible to arrange two or more optical connector boots such that their curved portions overlap the attachment portions. Thus, if arranged in great numbers, the optical connector boots do not occupy too much space, thus helping to achieve space saving, which makes the optical connector suitable for high-density mounting.

In the optical connector boot according to the present invention, the cable passing portion is positionally deviated sidewise with respect to the above-mentioned axis by the outer width thereof, so that when two or more optical connector boots are superimposed one upon the other with their curved portions overlapping the attachment portions, the attachment portions of a number of optical connector boots are placed in alignment on the same axis and outside protruding portions of the cable passing portions are placed in alignment on the same axis, thus realizing an orderly arrangement. Further, since little waste of installation space is involved, it is possible to achieve space saving.

In the optical connector boot according to the present invention, the cable passing portions are positionally deviated sidewise with respect to the above-mentioned axis starting with a position near the attachment portion, so that when a number of optical connector boots are arranged as shown in FIGS. 11A and 11B, the adjacent optical connector boots can superimposed one upon the other on the position near the attachment portions, whereby the waste of installation space involved is so much the less, thereby making it possible to realize a mounting of still higher density.

When the vertical multi-directional load is applied to the flat type optical fiber cable passed through the optical connector boot according to the present invention, the boot undergoes no bending regarding a certain direction, so that it is possible to prevent the optical connector from being bent by the load in that direction. Further, the flat type optical fiber cable is gently twisted within the boot, so that even when the vertical multi-directional load is applied thereto, no excessive load is applied to the fiber, thus preventing an increase in connection loss and a break in the cable attributable to abrupt twisting.

What is claimed is:

1. An optical connector boot comprising:

an attachment portion attached to a connector ferrule provided in a straight main body; and a cable passing portion which is straight and through which a flat type optical fiber cable is passed into said main body, wherein there is provided at one longitudinal end of the cable passing portion an inlet for introducing the flat type optical fiber cable into the cable passing portion at a first angle, wherein there is provided in said attachment portion an outlet for drawing out the flat type optical fiber cable at a second angle that is about 45° with respect to the first angle, the inlet and the outlet have flat sections, the inlet and the outlet differ from each other in orientation by about 45° so that the flat type optical fiber cable inserted into the cable passing portion through the inlet is twisted around its axis within the cable passing portion by drawing it out of the outlet, and a plurality of pairs of slits are formed in the outer peripheral surface of said main body and arranged in the longitudinal direction thereof, each slit being thin and narrow in the lateral direction of said main body, each pair having a first slit positioned on one side in the lateral direction of said main body, and a second slit positioned at an opposite side of said cable passing portion, at approximately a same longitudinal distance from said inlet.

2. An optical connector boot according to claim 1, wherein there is provided in the cable passing portion a support portion for supporting the twisted flat type optical fiber cable from below.

3. An optical connector boot according to claim 2, wherein support portions are provided at two or more longitudinal positions of the cable passing portion, and wherein each support portion is equipped with an inclined support surface capable of supporting the flat type optical fiber cable from below, with the inclination angle of the support surface changing gradually from the support portion on the inlet side toward the support portion on the outlet side.

4. An optical connector boot according to claim 2, wherein there is provided a support portion so as to extend over the entire longitudinal length of the cable passing portion, and wherein the support portion is equipped with an inclined support surface capable of supporting the flat type optical fiber cable from below, with the inclination angle of the support surface changing gradually from the inlet side toward the outlet side.

5. An optical connector boot according to claim 1, wherein the optical connector boot is formed of a material having a Shore hardness of 70° (Shore A) or more.

6. An optical connector boot comprising:

an attachment portion attached to a connector ferrule provided in a straight main body, and a cable passing portion which is straight and of a quadrilateral sectional configuration and through which a flat type optical fiber cable is passed into said main body, wherein said cable passing portion is generally straight from one longitudinal end thereof toward the other end, wherein there is provided at one longitudinal end of the cable passing portion an inlet for introducing the flat type optical fiber cable into said cable passing portion at a first angle, wherein there is provided in said attachment portion an outlet for drawing out the flat type optical fiber cable inserted into the cable passing portion, wherein the inlet and the outlet have flat sections, and wherein the inlet and the outlet differ from each other in orientation so that the flat type optical fiber cable is at a second angle about 45° with respect to the first angle so by being twisted around its axis within the cable passing portion by drawing it out of the outlet, and a plurality of pairs of slits are formed in the outer peripheral surface of said main body and arranged in the longitudinal direction thereof, each slit being thin and narrow in the lateral direction of said main body, each pair having a first slit positioned on one side in the lateral direction of said main body, and a second slit positioned at an opposite side of said cable passing portion, at approximately a same longitudinal distance from said inlet.

7. An optical connector boot according to claim 6, wherein there is provided in the cable passing portion a support portion for supporting the twisted flat type optical fiber cable from below.

8. An optical connector boot according to claim 7, wherein support portions are provided at two or more longitudinal positions of the cable passing portion, and wherein each support portion is equipped with an inclined support surface capable of supporting the flat type optical fiber cable from below, with the inclination angle of the support surface changing gradually from the support portion on the inlet side toward the support portion on the outlet side.

9. An optical connector boot according to claim 7, wherein there is provided a support portion so as to extend over the entire longitudinal length of the cable passing portion, and wherein the support portion is equipped with an inclined support surface capable of supporting the flat type optical fiber cable from below, with the inclination angle of the support surface changing gradually from the inlet side toward the outlet side.

10. An optical connector boot according to claim 6, wherein the optical connector boot is formed of a material having a Shore hardness of 70° (Shore A) or more.

11. An optical connector in which a flat type optical fiber cable inserted into and secured a ferrule is covered with an optical connector boot as claimed in one of claims 5 or 10.

* * * * *